(12) United States Patent
MacGillivray et al.

(10) Patent No.: US 9,453,900 B2
(45) Date of Patent: Sep. 27, 2016

(54) METHOD AND APPARATUS FOR THREE DIMENSIONAL WAVENUMBER-FREQUENCY ANALYSIS

(71) Applicant: Lockheed Martin Corporation, Bethesda, MD (US)

(72) Inventors: John R. MacGillivray, Fayetteville, NY (US); David L. Graham, Pennellville, NY (US); Dane E. Reiner, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 629 days.

(21) Appl. No.: 13/838,016

(22) Filed: Mar. 15, 2013

(65) Prior Publication Data

US 2014/0269197 A1  Sep. 18, 2014

(51) Int. Cl.
*G01S 3/80* (2006.01)
*G01S 3/86* (2006.01)

(52) U.S. Cl.
CPC ... *G01S 3/80* (2013.01); *G01S 3/86* (2013.01)

(58) Field of Classification Search
CPC .......... G03H 3/00; G03B 42/00; G01V 1/28
USPC ................. 367/119, 8, 129; 702/14
See application file for complete search history.

(56) References Cited

U.S. PATENT DOCUMENTS

| | | | | |
|---|---|---|---|---|
| 4,891,762 A * | 1/1990 | Chotiros | ................ | 701/514 |
| 4,906,940 A * | 3/1990 | Greene et al. | ................ | 382/100 |
| 5,182,729 A * | 1/1993 | Duren et al. | ................ | 367/38 |
| 5,736,958 A * | 4/1998 | Turpin | ................ | 342/179 |
| 5,751,243 A * | 5/1998 | Turpin | ................ | 342/179 |
| 6,162,627 A * | 12/2000 | Inouye | ................ | C12N 9/1223 435/194 |
| 8,542,555 B1 * | 9/2013 | Uzes | ................ | G01S 3/143 367/87 |
| 8,954,193 B2 * | 2/2015 | Sandin et al. | ................ | 700/258 |
| 9,074,892 B2 * | 7/2015 | Fink | | |
| 2002/0069019 A1 * | 6/2002 | Lin | ................ | 701/301 |
| 2003/0032034 A1 * | 2/2003 | Tang | ................ | A61K 38/16 435/6.16 |
| 2003/0036835 A1 * | 2/2003 | Breed et al. | ................ | 701/45 |
| 2003/0065262 A1 | 4/2003 | Stergiopoulos et al. | | |

(Continued)

OTHER PUBLICATIONS

International Search Report dated Aug. 19, 2014 for related International Application No. PCT/US14/29326.

(Continued)

*Primary Examiner* — Luke Ratcliffe
*Assistant Examiner* — Amienatta M Ndure Jobe
(74) *Attorney, Agent, or Firm* — Howard IP Law Group, PC (57) ABSTRACT

A method and apparatus for identifying an unidentified sound source in a 3-dimensional sensor array calculates a position vector for each of a plurality of sensors in the array. A time Fourier transform is computed based on time samples from each of the sensors. A spatial Fourier transform is computed for the results of the time Fourier transform and in part on the position vectors calculated. All three dimensional components of the wavenumber of the received signal, $k_x$, $k_y$, and $k_z$ are explicitly calculated to generate spatial frequency information in all three dimensions. Direction of arrival of the received sound signal is determined in all three spatial directions providing unambiguous target localization and acoustic signature characterization.

18 Claims, 4 Drawing Sheets

(56) References Cited

U.S. PATENT DOCUMENTS

| | | | |
|---|---|---|---|
| 2003/0210179 A1* | 11/2003 | Dizaji et al. | 342/159 |
| 2004/0027127 A1 | 2/2004 | Mills | |
| 2004/0129478 A1* | 7/2004 | Breed et al. | 180/273 |
| 2005/0046584 A1* | 3/2005 | Breed | 340/825.72 |
| 2005/0195103 A1* | 9/2005 | Davis | H01Q 21/22 342/99 |
| 2005/0240253 A1* | 10/2005 | Tyler et al. | 607/134 |
| 2006/0055584 A1* | 3/2006 | Waite et al. | 342/22 |
| 2006/0285602 A1* | 12/2006 | Lim | H04L 25/4908 375/260 |
| 2007/0070814 A1* | 3/2007 | Frodyma et al. | 367/134 |
| 2008/0224929 A1* | 9/2008 | Freed | 342/377 |
| 2009/0144480 A1* | 6/2009 | Cho | G06F 15/7842 710/317 |
| 2010/0211321 A1* | 8/2010 | Ozdemir et al. | 702/14 |
| 2011/0017949 A1* | 1/2011 | Golovin | C09K 19/02 252/299.01 |
| 2011/0164466 A1 | 7/2011 | Hald | |
| 2012/0064916 A1 | 3/2012 | Woodsum | |

OTHER PUBLICATIONS

Bao, Chaoying and Bertilone, Derek C. "Frequency-Wavenumber Analysis of Self-Noise in Circular Sonar Arrays", Information, Decision and Control, 2002, Final Program and Abstracts, ISBN 0-7803-7270-0, ID26, pp. 235-240 (6 pgs.), IEEE, 2002.

* cited by examiner

METHOD AND APPARATUS FOR THREE DIMENSIONAL WAVENUMBER-FREQUENCY ANALYSIS

STATEMENT OF GOVERNMENT INTEREST

This invention was made with Government support under Contract No. N00024-03-C-5115 awarded by the Department of the Navy. The Government has certain rights in this invention.

FIELD OF THE INVENTION

The present invention relates to wavenumber-frequency analysis. Particularly, the present invention relates to wavenumber-frequency analysis in three dimensions.

BACKGROUND

Systems for receiving and analyzing sound signals, for example, undersea sonar systems, utilize multiple transducers in a variety of configurations to receive and process sound signals from the environment. Detected sounds may indicate the presence of a friendly or enemy vessel. Sound signatures associated with each type of sound may be used to correlate the detected sound and aid in identifying its source. In addition to the sound signals associated with a particular target, other sound sources emit signals that may be received by the transducers. For example, the sound of water flowing past the sonar array, or vibrations from structural elements within the array, may generate sound waves that are also detectable by the sonar array. These sound signals are referred to as self-noise. Self-noise interferes with the straightforward identification of target sounds and therefore should be identified and removed from the overall signals received.

The presence of self noise may compromise the ability to effectively detect remote targets. Structural and flow self-noise often travel at sub-sonic speeds (i.e. less than the speed of sound in water). One aspect of wavenumber-frequency (kω) analysis allows for the separation of sub-sonic noise sources from sonic noise sources. Sub-sonic noise sources may be identified by their propagation characteristics or a known acoustic signature. Accurate identification of the self-noise sources allows for compensation or remediation of the noise, enabling better identification of target sounds.

One and two dimensional wavenumber-frequency analysis provides limited information on self-noise sound sources. One-dimensional kω analysis is utilized for linear sonar arrays, for example, a towed linear array or a segment of a curved array using a linear approximation. However, one-dimensional kω analysis only accounts for the $k_x$ component of k and the frequency. Thus the $k_y$ and $k_z$ components remain unaccounted for. The lack of these k components result in ambiguities with respect to the direction of arrival of a detected self-noise sound source. Similarly, in two-dimensional kω analysis, only the $k_x$ and $k_y$ components of k are accounted for. Thus, ambiguities with respect to the $k_z$ component of k are extant.

Alternative techniques for identifying self-noise and resolving problems associated with the identification of self noise within an overall received signal containing information associated with a target of interest, is desirable.

SUMMARY

A sensor array configured to receive wave data in three dimensions comprises a plurality of sensors for receiving wave data. Each sensor may be referenced by the sensor's coordinate position on the array, represented by a position vector. A time based Fourier transform is performed on data samples from each sensor. A spatial Fourier transform then computes spatial wavenumber-frequency spectra as a function of the received wave data in three dimensions to account for the wavenumber's orthogonal components, $k_x$, $k_y$, and $k_z$ associated with the x, y and z orthogonal axes, respectively.

A sonar array for providing three dimensional sensor data comprises a plurality of sensors disposed on a surface of the three dimensional sonar array, the surface defining a geometric surface area; a processor configured to: receive data from each of the plurality of sensors; compute a position vector for each of the plurality of sensors based on a coordinate position of each sensor in three dimensions with respect to the geometric surface area; compute a time Fourier transform on time samples received from each sensor; compute a spatial Fourier transform based in part on the calculated position vectors; and output the results of the spatial Fourier transform.

A method of computing wavenumber-frequency spectra comprises accounting for the wavenumber's x, y and z orthogonal axis directional components. A position vector is computed based on a sensor's position relative to the sensor array. A time based Fourier transform is performed on data samples from each sensor, and a spatial Fourier transform is performed on the data samples accounting for a position vector for each sensor. Explicit inclusion of $k_z$, where the z-axis is along the axis of the sensor array enables direction of arrival of incoming waves to be determined in all three spatial dimensions, and provides enhanced and unambiguous target localization and source signature characterization.

DETAILED DESCRIPTION

Sensor arrays have been developed to enhance reception of signals directed toward the array. For example, in sonar systems used on ships, an array of sensors, each sensor comprising a transducer containing at least one hydrophone, are arranged in a manner which enhances the array's ability to detect sound in the water. Sensors in a sonar array may be arranged in a number of different configurations. For example, sensors may be arranged in a linear or rectangular (planar) configuration. Alternatively, sensors may be disposed along the surface of a circular array, often with the direction of receiving beams from the sensors radiating out from the circles' center and outward from the sensors. This allows for detection of target sounds in the plane containing the circular array. In addition to linear and circular arrays, cylindrical array geometries are also used. A cylindrical array may be formed by vertically stacking a series of circular arrays on top of one another. The sensors of each ring may be aligned in the vertical direction to form a cylindrical array having rows and columns of sensors across the cylindrical surface of the array.

Figure 1:
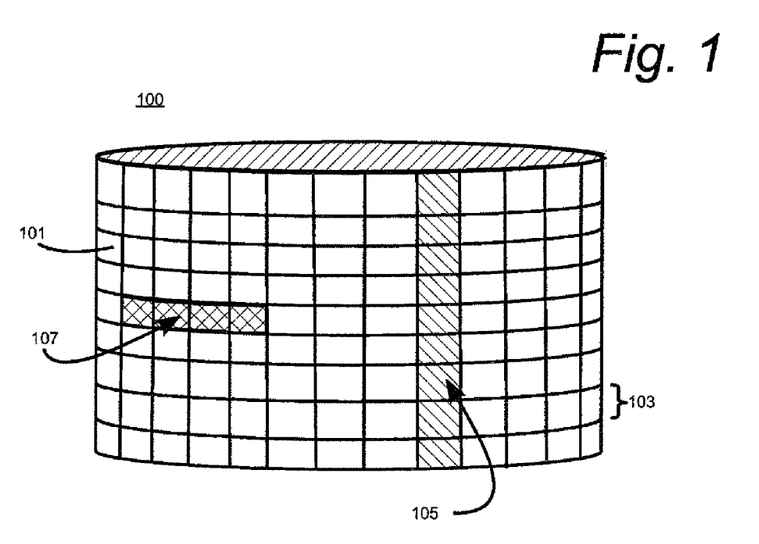
FIG. 1 is an illustration of a cylindrical sensor array.

Referring now to FIG. 1, there is shown an example of a cylindrical array 100 comprised of a plurality of sensors 101. Sensors 101 are arranged as a group of circular array 103 components. In this example, the cylindrical array 100 is comprised of eight circular array 103 components. Within each circular array 103 component there exists a plurality of sensors 101. By way of example, each circular array 103 component may be comprised of 72 sensors 101. It is understood that other configurations and numbers of sensors 101 are contemplated by one skilled in the art and would fall within the scope of the present invention.

Each sensor 101 of the cylindrical array 100 receives signals in the form of wave energy transmitted in the medium in which the cylindrical array 100 is located. For example, for array 100 configured as a sonar array, sound wave energy transmitted through the water is sensed by the sensors 101 in the array 100. Certain sound waves detected by the sensors 101 may be associated with a potential target, such as an enemy ship or submarine. However, in addition to sound waves emanating from such target sources, other sound wave energy may be detected by sensors 101. For example, sound wave energy relating to the sound of water flowing past the array 100 may be detected by some or all of the sensors 101. Other sound energy, such as vibrating energy associated with a structural component of the array 100, may be detected by the one or more sensors 101. These non-target sound sources are called self-noise. In order to accurately identify target sounds, self-noise must be detected, identified and accounted for.

Wavenumber-frequency (kω) analysis is one technique utilized to compensate for self-noise. The wavenumber (k) of a sound wave is defined as the number of wavelengths per unit distance, or the spatial frequency of the wave. Frequency represents the number of wavelengths per unit time, or the temporal frequency of the wave. By analyzing the wavenumber and the frequency of a received wave signal, the speed of propagation may also be determined. In a linear implementation performing kω using the cylindrical array 100, a subset of sensors 101 may be chosen from which to take samples. In one example, the subset of sensors 101 are arranged in a vertical linear configuration 105 along the axis of the cylindrical array 100. One sensor from each circular array 103 component is selected such that the eight selected sensors 101 are arranged in a vertical linear configuration 105. In another embodiment, a subset of adjacent sensors 101 contained in the same circular array 103 component may be considered to form a horizontal linear configuration 107 (which may also be treated as a linear array). Although the sensors 101 in the horizontal linear configuration 107 are disposed along an arc segment of circular array 103 component, using a small number of sensors 101 approximates a linear array. By implementing one-dimensional wavenumber-frequency analysis on the data received by the linear array, sounds may be identified relating to a linear beam of reception defined by the line of the sensors 101 of interest. However when using the one-dimensional approach, the distance and direction cannot be determined due to ambiguities inherent in the one-dimensional kω analysis.

A circular version of the kω analysis in two-dimensions has been developed which provides a spatial transform of received signals in the $k_x$ and $k_y$ components of the wavenumber vector. However, a two-dimensional analysis does not provide a vertical component of the wavenumber and thus continues to introduce ambiguities. For example, if one considers the cylindrical array 100, two-dimensional circular array kω analysis requires certain assumptions be made. For example, one of the circular array 103 components may be considered to be representative of all other circular array 103 components. Alternatively, each of the sensors in each of the vertical linear configurations 105 may be summed to create a virtual single circular array 103 that is an average of all of the circular array 103 components.

Figure 2:
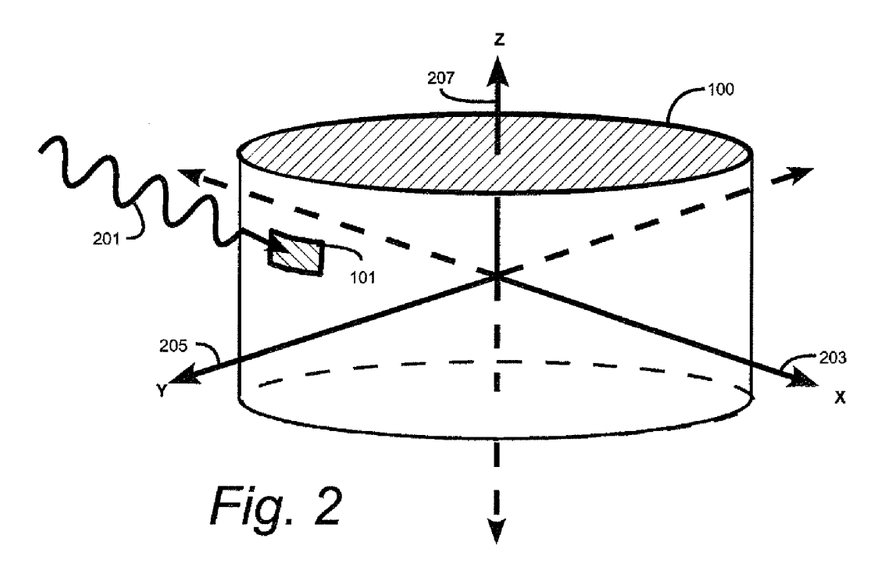
FIG. 2 is an illustration of a three dimensional cylindrical sensor array receiving a directional sound signal.

FIG. 2 shows a sound source 201 arriving at cylindrical array 100. The sound source 201 arrives at one or more sensors 101, only one of which is shown in FIG. 2 for simplicity. The path of the wave generated by sound source 201 arrives in three-dimensional space at sensor 101 with a bearing relative to the x-axis 203, the y-axis 205, and the z-axis 207 of the cylindrical array 100. To account for and eliminate the ambiguities associated with the one-dimensional and two-dimensional kω approaches described above, the z component of the wave is explicitly included in the kω processing.

Figure 3:
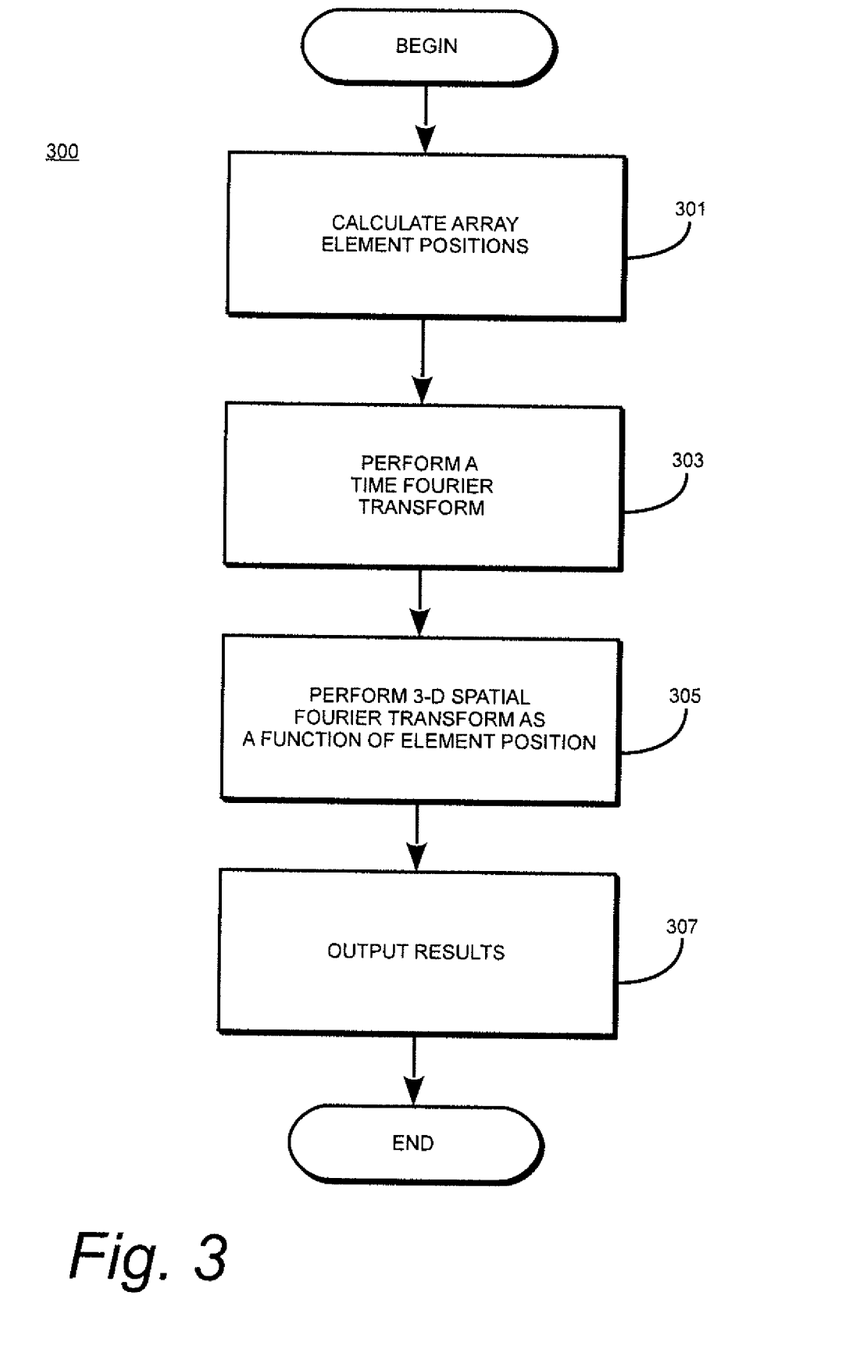
FIG. 3 is a flow diagram for performing a wavenumber-frequency analysis in three dimensions according to an embodiment of the present invention.

A method of kω processing explicitly including the z axis component of a sound source 300 is shown in FIG. 3. The sensor 101 position relative to the array 100 is calculated according to Equation 1 as shown in step 301 where:

$$\vec{r}_{l,m} = \rho\cos\left(\frac{2\pi m}{M}\right)\vec{x} + \rho\sin\left(\frac{2\pi m}{M}\right)\vec{y} + h\left(\frac{l-1}{L-1} - 0.5\right)\vec{z} \quad \text{Equation 1}$$

where $\vec{r}_{l,m}$ is a position vector for the element position;
l,m are sensor positions labeled according to layer, l and circular position, m;
M is the number of sensors per layer;
L is the number of layers;
h is the height of the array;
ρ is the radius of the array; and
$\vec{x}, \vec{y}$, and $\vec{z}$ are unit vectors in the x, y and z coordinates.

A time based Fourier transform is then performed on time samples of each sensor identified by layer l and circular position m according to Equation 2 as shown in step 303:

$$P_{l,m}(\omega) = \frac{1}{N}\sum_{n=0}^{N-1} x_{l,m,n} e^{j\omega n \Delta t} \quad \text{Equation 2}$$

where
$x_{l,m,n} = p(\vec{r}_{l,m,n}, n\Delta t)$, pressure as function of position and sampled time
ω is radian frequency (ω=2πf, where f is Hertz frequency);
$j=\sqrt{-1}$; and
Δt is the sampling period.

The kω spectral amplitudes are calculated by performing another Fourier transform on the time samples calculated in Equation 2. A three-dimensional spatial Fourier transform is performed, based in part on the position vector calculated in Equation 1 as shown in step 305. The three-dimensional spatial Fourier transform is performed according to Equation 3.

$$B(\vec{k}, \omega) = \frac{1}{LM}\sum_{l=0}^{L-1}\sum_{m=0}^{M-1} P_{l,m}(\omega) e^{-j(\vec{k}\cdot\vec{r}_{l,m})} \quad \text{Equation 3}$$

where $B(\vec{K}, \omega)$ is the wavenumber-frequency spectral amplitude; and $\vec{K}$ is the wavevector (spatial radian frequency vector).

The resulting three-dimensional kω spectra may be post-processed as shown in step 307. Post processing may include algorithms on the data itself, or simply convert the data into an image to aid in data interpretation and analysis. Images may be 2D or 3D. 3D images may include transparency options to allow probing the 3D volume of wavenumber space. As an example, an image showing "hotspots" in 3D wavenumber space indicates the x, y and z components of the wavevector for the given analysis frequency.

Figure 4:
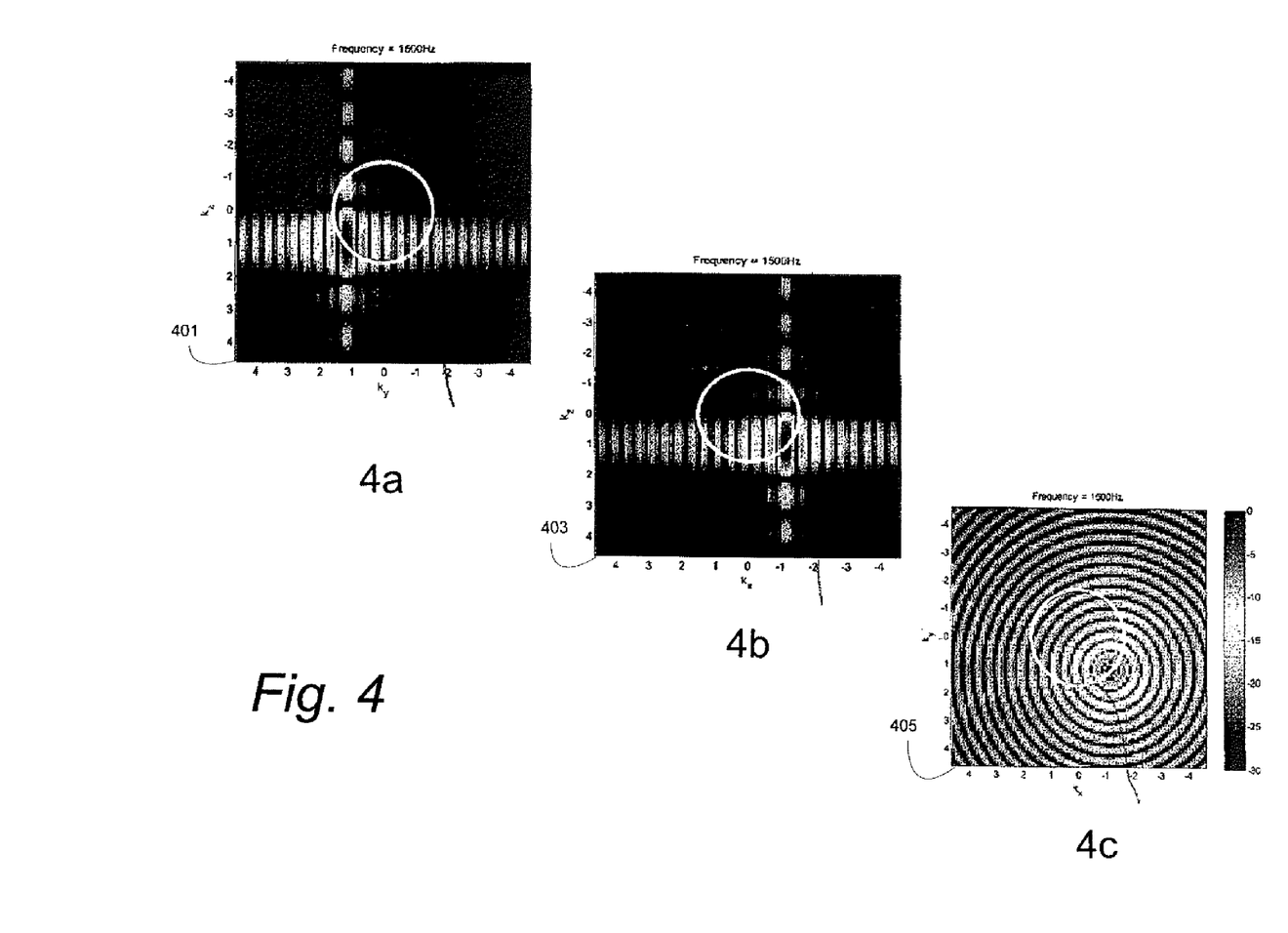
FIG. 4 is an illustration of an output of a three-dimension wavenumber frequency analysis according to an embodiment of the present invention.

Referring now to FIG. 4a-4c, a graphical representation of the results of 3D cylindrical kω processing according to an embodiment of the present invention is shown. Here a simulated test plane wave signal at 1500 Hz is assigned a particular direction of propagation, and the wave is directed toward a cylindrical sonar array in a simulated water medium with sound speed c. The kω analysis shown is for this 1500 Hz frequency. In the 3D kω volume, a single hotspot representing this wave should appear in a 3D image of the magnitude of the frequency-wavenumber spectrum. Also, this hotspot should lie on the surface of an "acoustic sphere" which, for freely propagating waves defines $k_x$, $k_y$ and $k_z$ components supported by the medium. The acoustic sphere defines valid wavenumber components for all possible directions of wave propagation; for a single wave freely traveling in a particular direction, the $k_x$, $k_y$ and $k_z$ are unique. FIG. 4a depicts a slice of the 3D kω spectrum in the y and z dimensions with $k_x$ fixed. Similarly, FIG. 4b is a slice of the 3D kω spectrum in the x and z dimensions for fixed $k_y$. FIG. 4c is a slice of the 3D kω spectrum the x and y dimensions for fixed $k_z$; this slice in x and y is identical to the 2D circular kω spectrum result.

Hotspots are seen at each of the 2D plots (4a, 4b, and 4c). These hotspots lie on acoustic circles 401, 403 and 405, which depict wavenumber components which are valid for freely propagating plane waves. (The acoustic circles are slices through the surface of the 3D acoustical sphere which appears in 3D space.) The three distinct hotspots in the three 2D plots are in fact the same single hotspot that appears in 3D space and it can be inferred that this hotspot intersects the surface of the acoustic sphere, as expected for this propagating wave simulation. The distinct $k_x$, $k_y$, and $k_z$ values associated with this hotspot are clearly identified in these 2D plots. These values agree with the $k_x$, $k_y$, and $k_z$ components of the simulated wave, and therefore the complete 3D characteristics of the simulated wave have been accurately identified. The result is an unambiguous detection of the test wave in all three dimensions.

Figure 5:
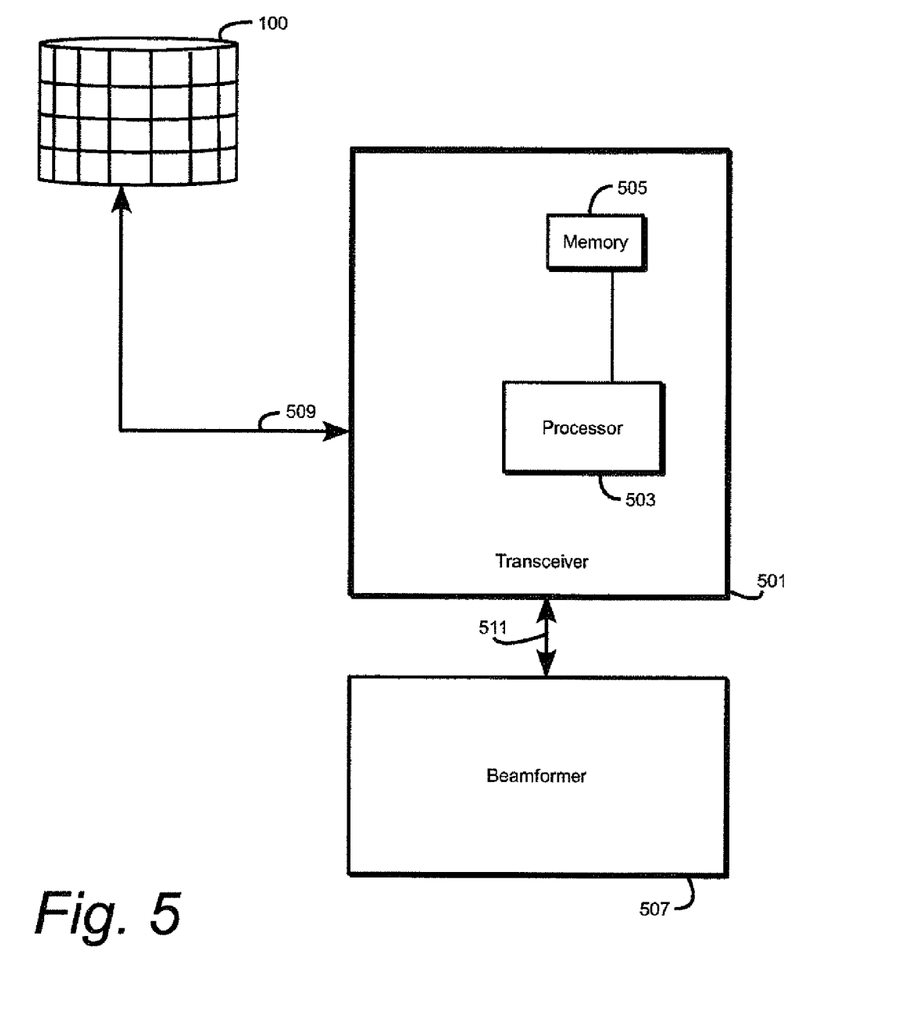
FIG. 5 is a block diagram of an architecture for carrying out the processing according to an embodiment of the present invention.

The relationship between wavenumber and frequency may also be used to determine the propagation speed of the medium in the vicinity of the array. Additionally, sound speed for self-noise sources which often travel and subsonic sound speeds (i.e. less than the speed of sound) can be assessed. One embodiment of the present invention provides comprehensive information relating to the wavenumber properties of a detected wave, thereby allowing for precise determination of propagation speed. Knowing the sound speed is useful for several reasons. For example, knowing the sound speed of the medium allows optimal time delays (or phase shifts) to be derived for beamformers. By knowing the acoustic signature and propagation characteristics of a sound source, it is easier to identify noise source problems such as self noise. FIG. 5 is an exemplary architecture for implementing the processing according to embodiments of the present invention. Sonar array 100 provides for three dimensional sensor data in communication with transceiver 501 via communication path 509 and with beamformer 507 via path 511. Transceiver 501 includes one or more processors 503 in communication with memory or data storage 505 and configured to: receive data from each of the plurality of sensors; compute a position vector for each of the plurality of sensors based on a coordinate position of each sensor in three dimensions with respect to the geometric surface area; compute a time Fourier transform on time samples received from each sensor; compute a spatial Fourier transform based in part on the calculated position vectors; and output the results of the spatial Fourier transform.

By way of example, the processor may be further configured to determine propagation speed as follows: because kω involves temporal fourier transform, the frequency f (Hz) which is associated with the $k_x$, $k_y$, and $k_z$ components are known. The wavenumber for plane waves may be computed using $k=\sqrt{k_x^2+k_y^2+k_z^2}$. The sound speed may then be computed using $$c = \frac{\omega}{k}.$$

For broadband signals, the hotspot may appear as a streak in an imaged display of ω versus k. The global, or local, slope of this streak can be used to infer the sound speed. For example, under local conditions (e.g. determining ω over a small range of frequencies) determination of the slope can aid in determining whether the sound speed is relatively constant or varying. Assessment over a large (global) or narrow (local) bandwidth may further contribute to target detection and/or analysis and detection of certain propagation paths and environmental conditions.

While the foregoing invention has been described with reference to the above-described embodiments, various modifications and changes can be made without departing from the spirit of the invention. Accordingly, all such modifications and changes are considered to be within the scope of the appended claim.

What is claimed is:

1. A method of computing wavenumber-frequency spectra comprising:

computing in a sonar array processor, a position vector for each sensor in a three-dimensional array of sensors, each position vector representative of a coordinate position of a corresponding sensor on a geometric surface defined by the three-dimensional array of sensors, in three orthogonal directions;

computing in the sonar array processor, a time Fourier transform on data from each said sensor in the array of sensors;

computing, in the sonar array processor, a spatial Fourier transform based in part on each computed position vector; and outputting by the sonar array processor, results of said spatial Fourier transform, which is indicative of three-dimensional signal data received by said three-dimensional array of sensors, wherein each position vector is computed according to:

$$\vec{r}_{l,m} = \rho\cos\left(\frac{2\pi m}{M}\right)\vec{x} + \rho\sin\left(\frac{2\pi m}{M}\right)\vec{y} + h\left(\frac{l-1}{L-1} - 0.5\right)\vec{z}$$

where
$\vec{x}$, $\vec{y}$, $\vec{z}$ are unit vectors in the x,y,z coordinates;
l,m are sensor position labeled corresponding to a layer l, and a circular position m;
M is a number of elements per layer;
L is a number of layers;
h is the array height; and
ρ is the radius of the array.

2. The method of claim 1, wherein said three-dimensional sensor array is configured as a cylindrical array.

3. The method of claim 1 wherein said time Fourier transform on the data from each sensor is computed according to:

$$P_{l,m}(\omega) = \frac{1}{N}\sum_{n=0}^{N-1} x_{l,m,n} e^{j\omega n \Delta t};$$

where
l,m are sensor position labeled corresponding to a layer l, and a circular position m;
n is a sample number, corresponding to time samples output by the sensors;
$j=\sqrt{-1}$;
ω is radian frequency;
N is the number of time samples to be analyzed; and
Δt is a sampling period.

4. The method of claim 1 wherein said spatial Fourier transform is computed according to:

$$B(\vec{k}, \omega) = \frac{1}{LM}\sum_{l=0}^{L-1}\sum_{m=0}^{M-1} P_{l,m}(\omega) e^{-j(\vec{k}\cdot\vec{r}_{l,m})};$$

where
l,m are sensor position labeled corresponding to a layer l, and a circular position m;
M is a number of elements per layer;
L is a number of layers;
ω is radian frequency;
$\vec{k}$ is a wavevector (spatial radian frequency vector); and
$B(\vec{k}, \omega)$ is wavenumber-frequency spectral amplitude.

5. A three-dimensional sensor array for receiving wave energy data comprising:
a plurality of sensors, wherein a position of each said sensor with respect to a geometric surface defined by said sensor array defines a sensor coordinate position in three orthogonal dimensions;
a sensor array processor coupled to said sensor array, said processor configured to receive said sensor coordinate position and wave energy data from each sensor in said plurality of sensors, said processor further configured to compute a position vector for each sensor in the plurality of sensors based on each sensor's coordinate position, and compute spatial wavenumber frequency spectra based at least in part on the computed position vectors, wherein said position vectors are computed according to:

$$\vec{r}_{l,m} = \rho\cos\left(\frac{2\pi m}{M}\right)\vec{x} + \rho\sin\left(\frac{2\pi m}{M}\right)\vec{y} + h\left(\frac{l-1}{L-1} - 0.5\right)\vec{z}$$

where
$\vec{x}$, $\vec{y}$, $\vec{z}$ are unit vectors in the x,y,z coordinates;
l,m are sensor position labeled corresponding to a layer l, and a circular position m;
M is a number of elements per layer;
L is a number of layers;
h is the array height; and
ρ is the radius of the array.

6. The sensor array of claim 5, wherein said sensor array is configured as a cylindrical sonar array.

7. The sensor array of claim 5, wherein computing wavenumber frequency spectra further comprises:
receiving at the sensor array processor, the sensor coordinate positions for each sensor in the sensor array and computing a position vector for each sensor;
performing a time Fourier transform on data from each sensor; and
performing a spatial Fourier transform based at least in part on the position vector of each sensor of the plurality of sensors.

8. The sensor array of claim 7, wherein performing a time Fourier transform on the data is according to:

$$P_{l,m}(\omega) = \frac{1}{N}\sum_{n=0}^{N-1} x_{l,m,n} e^{j\omega n \Delta t};$$

where
l,m are sensor position labeled corresponding to a layer l, and a circular position m;
n is a sample number, corresponding to time samples output by the sensors;
$j=\sqrt{-1}$;
ω is radian frequency;
N is the number of time samples to be analyzed; and
Δt is a sampling period.

9. The sensor array of claim 7, wherein performing a spatial Fourier transform is according to:

$$B(\vec{k}, \omega) = \frac{1}{LM}\sum_{l=0}^{L-1}\sum_{m=0}^{M-1} P_{l,m}(\omega) e^{-j(\vec{k}\cdot\vec{r}_{l,m})};$$

where
l,m are sensor position labeled corresponding to a layer l, and a circular position m;
M is a number of elements per layer;
L is a number of layers;
ω is radian frequency;
$\vec{k}$ is a wavevector (spatial radian frequency vector); and
$B(\vec{k}, \omega)$ is wavenumber-frequency spectral amplitude.

10. A method of identifying sound sources in a three-dimensional sonar array comprising:
receiving an unidentified sound source signal via at least one of a plurality of sensors disposed on a surface defined by said three-dimensional sonar array;
defining a corresponding position vector for each sensor of said plurality of sensors based on a coordinate position of each sensor in three dimensions;
performing a time Fourier transform on time samples received at each of said plurality of sensors;

performing a spatial Fourier transform based at least in part on the position vector of each of said plurality of sensors;
analyzing the wavenumber and frequency of said unidentified sound source signal to determine an acoustic signature associated with said unidentified sound; and
identifying said sound source based on said acoustic signature wherein each position vector is computed according to:

$$\vec{r}_{l,m} = \rho\cos\left(\frac{2\pi m}{M}\right)\vec{x} + \rho\sin\left(\frac{2\pi m}{M}\right)\vec{y} + h\left(\frac{l-1}{L-1} - 0.5\right)\vec{z}$$

where
$\vec{x}, \vec{y}, \vec{z}$ are unit vectors in the x,y,z coordinates;
l,m are sensor position labeled corresponding to a layer l, and a circular position m;
M is a number of elements per layer;
L is a number of layers;
h is the array height; and
$\rho$ is the radius of the array.

11. The method of claim 10, wherein determining said acoustic signature comprises determining a speed of propagation of said sound source.

12. The method of claim 10, wherein said unidentified sound source is self noise.

13. A sonar array for providing three dimensional sensor data comprising:
a plurality of sensors disposed on a surface of said three dimensional sonar array, said surface defining a geometric surface area;
a processor configured to:
receive data from each of said plurality of sensors;
compute a position vector for each sensor of said plurality of sensors based on a coordinate position of each corresponding sensor in three dimensions with respect to said geometric surface area according to:

$$\vec{r}_{l,m} = \rho\cos\left(\frac{2\pi m}{M}\right)\vec{x} + \rho\sin\left(\frac{2\pi m}{M}\right)\vec{y} + h\left(\frac{l-1}{L-1} - 0.5\right)\vec{z};$$

where
$\vec{x}, \vec{y}, \vec{z}$ are unit vectors in the x,y,z coordinates;
l,m are sensor position labeled corresponding to a layer l, and a circular position m;
M is a number of elements per layer;
L is a number of layers;
h is the array height; and
$\rho$ is the radius of the array;
compute a time Fourier transform on time samples received from each sensor;
compute a spatial Fourier transform based in part on said computed position vectors; and
output the results of said spatial Fourier transform, which is indicative of the sensor data.

14. The sonar array of claim 13, wherein said geometric surface area is cylindrical.

15. The sonar array of claim 13, where said time Fourier transform is computed according to:

$$P_{l,m}(\omega) = \frac{1}{N}\sum_{n=0}^{N-1} x_{l,m,n} e^{j\omega n \Delta t};$$

where
l,m are sensor position labeled corresponding to a layer l, and a circular position m;
n is a sample number, corresponding to time samples output by the sensors;
$j=\sqrt{-1}$;
$\omega$ is radian frequency;
N is the number of time samples to be analyzed; and
$\Delta t$ is a sampling period.

16. The sonar array of claim 13, wherein said spatial Fourier transform is computed according to:

$$B(\vec{k}, \omega) = \frac{1}{LM}\sum_{l=0}^{L-1}\sum_{m=0}^{M-1} P_{l,m}(\omega) e^{-j(\vec{k}\cdot\vec{r}_{l,m})};$$

where
l,m are sensor position labeled corresponding to a layer l, and a circular position m;
M is a number of elements per layer;
L is a number of layers;
$\omega$ is radian frequency;
$\vec{k}$ is a wavevector (spatial radian frequency vector); and
$B(\vec{k}, \omega)$ is wavenumber-frequency spectral amplitude.

17. A three-dimensional sensor array for receiving wave energy data comprising:
a plurality of sensors, wherein a position of each said sensor with respect to a geometric surface defined by said sensor array defines a sensor coordinate position in three orthogonal dimensions;
a sensor array processor coupled to said sensor array said processor configured to receive said sensor coordinate position and wave energy data from each sensor in said plurality of sensors, said processor further configured to compute a position vector for each sensor in the plurality of sensors based on each sensor's coordinate position, and compute spatial wavenumber frequency spectra based at least in part on the computed position vectors, according to:

$$B(\vec{k}, \omega) = \frac{1}{LM}\sum_{l=0}^{L-1}\sum_{m=0}^{M-1} P_{l,m}(\omega) e^{-j(\vec{k}\cdot\vec{r}_{l,m})};$$

where
l,m are sensor position labeled corresponding to a layer l, and a circular position m;
M is a number of elements per layer;
L is a number of layers;
$\omega$ is radian frequency;
$\vec{k}$ is a wavevector (spatial radian frequency vector); and
$B(\vec{k}, \omega)$ is wavenumber-frequencly spectral amplitude.

18. A method of identifying sound sources in a three-dimensional sonar array comprising:
receiving an unidentified sound source signal via at least one of a plurality of sensors disposed on a surface defined by said three-dimensional sonar array;
defining a corresponding position vector for each sensor of said plurality of sensors based on a coordinate position of each sensor in three dimensions;

performing a time Fourier transform on time samples received at each of said plurality of sensors according to:

$$P_{l,m}(\omega) = \frac{1}{N}\sum_{n=0}^{N-1} x_{l,m,n} e^{j\omega n \Delta t};$$

where
l,m are sensor position labeled corresponding to a layer l, and a circular position m;
n is a sample number, corresponding to time samples output by the sensors;
$j=\sqrt{-1}$;
ω is radian frequency;
N is the number of time samples to be analyzed; and
Δt is a sampling period;
performing a spatial Fourier transform based at least in part on the position vector of each of said plurality of sensors;
analyzing the wavenumber and frequency of said unidentified sound source signal to determine an acoustic signature associated with said unidentified sound; and
identifying said sound source based on said acoustic signature.

\* \* \* \* \*